(12) United States Patent
Shope et al.

(10) Patent No.: US 6,299,103 B1
(45) Date of Patent: Oct. 9, 2001

(54) ADJUSTABLE EMERGENCY EJECTION SEAT

(75) Inventors: William Barry Shope, Arden; James W. Duncan, Asheville, both of NC (US)

(73) Assignee: Simula, Inc., Phoenix, AR (US)

( * ) Notice: Subject to any disclaimer, the term of this patent is extended or adjusted under 35 U.S.C. 154(b) by 0 days.

(21) Appl. No.: 09/491,443

(22) Filed: Jan. 26, 2000

Related U.S. Application Data
(60) Provisional application No. 60/117,290, filed on Jan. 26, 1999.

(51) Int. Cl.[7] .................................................... B64D 11/06
(52) U.S. Cl. ................... 244/122 A; 297/216.16
(58) Field of Search ........................... 297/261.1, 216.2, 297/216.16, 216.17, 216.18, 216.19, 344.12, 344.13, 344.14, 344.15, 440.14, 188.01, 452.18, 464, 466; 244/122 A, 122 R, 122 AH (56) References Cited

U.S. PATENT DOCUMENTS

| | | | |
|---|---|---|---|
| 2,702,677 | * | 2/1955 | Replogle . |
| 3,421,720 | * | 1/1969 | MacDonald, Jr. et al. . |
| 3,424,408 | * | 1/1969 | Martin . |
| 4,301,983 | * | 11/1981 | Horan . |
| 4,787,576 | * | 11/1988 | McGrady et al. . |

* cited by examiner

*Primary Examiner*—Milton Nelson, Jr.
(74) *Attorney, Agent, or Firm*—Shaw Pittman (57) ABSTRACT

An emergency ejection seat adjustable along two independent axes: vertical adjustment (up and down) and horizontal adjustment (fore and aft). The ejection seat adjusts to accommodate all aircrew sizes, sitting shoulder heights, buttock-knee lengths, and functional limb reaches and is constructed of modular components which are easily removed and replaced. The ejection seat comprises a seat bucket structure, a seat insert, a linkage assembly and equipment bays. The linkage assembly interfaces between the ejection seat bucket structure and seat insert to allow both vertical and horizontal adjustment.

20 Claims, 12 Drawing Sheets

ADJUSTABLE EMERGENCY EJECTION SEAT

This application claims the benefit of U.S. Provisional Application No. 60/117,290, filed Jan. 26, 1999.

BACKGROUND

1. Field of the Invention

The present invention relates generally to emergency ejection seats used in aircraft.

2. Background of the Invention

Ejection seats are typically used in aircraft to provide rapid egress out of and away from the aircraft in the event of an emergency. Emergency ejection seat systems must protect the occupant during all phases of the ejection sequence. The seat must also accommodate the seat occupant during non-emergency operation of the aircraft. Finally, maintenance personnel should have easy access the various components of the seat to assure the operational readiness of the systems.

Emergency ejection seats generally follow a well defined sequence of operation. First, the aircrew member initiates ejection by pulling up ejection handles usually located alongside of or between the crewmember's legs. Once ejection is initiated, the crewmember is automatically restrained in the seat and a cartridge fires a gun catapult raising the ejection seat along fixed guide rails out of the aircraft. The canopy of the aircraft is either removed or shattered to allow for free exit from the aircraft. As the seat exits the aircraft, a rocket motor ignites producing thrust sufficient to propel the seat and its occupant away from the aircraft. The seat must also be propelled high enough to allow the main chute to deploy in the case of ejection at ground level. Pitot static tubes are used to determine the altitude and airspeed of the ejection seat. For ejection at low altitude and low airspeed, the crewmember is separated from the seat and the main chute deploys immediately following ejection. For ejection at higher altitudes and airspeeds a drogue chute is deployed as the seat leaves the aircraft rails to provide initial stabilization. Once the seat reaches the proper altitude and airspeed the crewmember is separated from the seat and the main chute deploys.

To minimize the chances of serious injury to the crewmember during ejection, the seat should be designed to absorb forces which otherwise would impact directly on the crewmember. In some prior art designs the ejection seat is constructed of heavy-weight material to add ballast to the system. In other prior art designs heavy survival equipment is stowed under the seat to provide the additional ballast. However, this extra weight (which otherwise may not be necessary) may affect the mission capabilities of the aircraft. Moreover, as aircraft are upgraded and new avionics or weapons systems must be accommodated, weight and storage space can become critical to proper functioning of the aircraft.

In addition to protecting the crewmember during an ejection sequence, the seat must provide safe, comfortable and efficient accommodation of the crewmember during normal flight activities. Ejection seats currently used in aircraft are adjustable only along the axis of the seat rails, which are typically angled slightly backward to provide a safe ejection trajectory. Thus, these seats can only be adjusted in one direction. Due to this limited capability, these seats cannot accommodate a wide range of aircrew member sizes. Even when the crew size is accommodated, the limited adjustment capability does not always provide optimal line of sight or comfort for the crewmember. In recent years the need to accommodate a greater range of crew sizes has increased dramatically with the increased number of female crewmembers.

Moreover, because emergency ejection seat systems are critical to aircrew safety the seat system must be regularly maintained. However, existing emergency ejection seats are constructed as a single integrated unit. Thus inspection and maintenance of even minor sub-components of the seat requires complete removal of the seat from the aircraft. Typically, the canopy of the aircraft must be removed prior to removing the ejection seat because of the size of the seat.

SUMMARY OF THE INVENTION

The present invention is an emergency ejection seat adjustable along two independent axes: vertical adjustment (up and down) and horizontal adjustment (fore and aft). The ejection seat of this invention provides accommodation of all aircrew sizes, sitting shoulder heights, buttock-knee lengths, and functional limb reaches. The ejection seat comprises a seat bucket structure, seat insert and a special linkage system. The seat bucket structure forms the outer frame of the seat and is secured by ejection rails in the cockpit. A rocket motor is attached to the back of the seat bucket structure.

The seat insert directly supports the crewmember in a seated position. Crewmember restraints and other control systems related to emergency ejection operations are attached to the seat insert. The seat insert is connected to the linkage assembly by parallel support levers. The support levers pivot forward and backward relative to the linkage assembly. Thus, the seat insert moves in an arc, providing up/down and fore/aft movement. The linkage assembly provides further vertical adjustment capability by sliding up and down in guide tracks which run along the inside walls of the seat bucket structure. The guide tracks maintain proper alignment of the linkage assembly and seat insert relative to the seat bucket structure.

The present invention is preferably constructed of modular components which are easily removed and replaced. Because of this modular structure, maintenance inspections and repairs can be accomplished without removal of the entire seat assembly. Additionally, the modular structure provides room for additional equipment bays located under the seat for avionics systems or crewmember equipment. The items stowed in these equipment bays provide additional weight and act as "smart ballast" during ejection reducing the injury potential to all sizes of crews by absorbing more acceleration loads into the seat.

It is an object of this invention to provide an emergency ejection seat adjustable along multiple independent axes to accommodate a greater range of aircrew sizes.

It is another object of this invention to provide an emergency ejection seat which is modularly constructed so that individual components may be inspected and repaired with minimal removal of equipment.

It is another object of this invention to provide safer ejection seats without limiting the overall capacity of aircraft systems due to excess weight.

DETAILED DESCRIPTION OF EMBODIMENTS OF THE INVENTION

Figure 1:
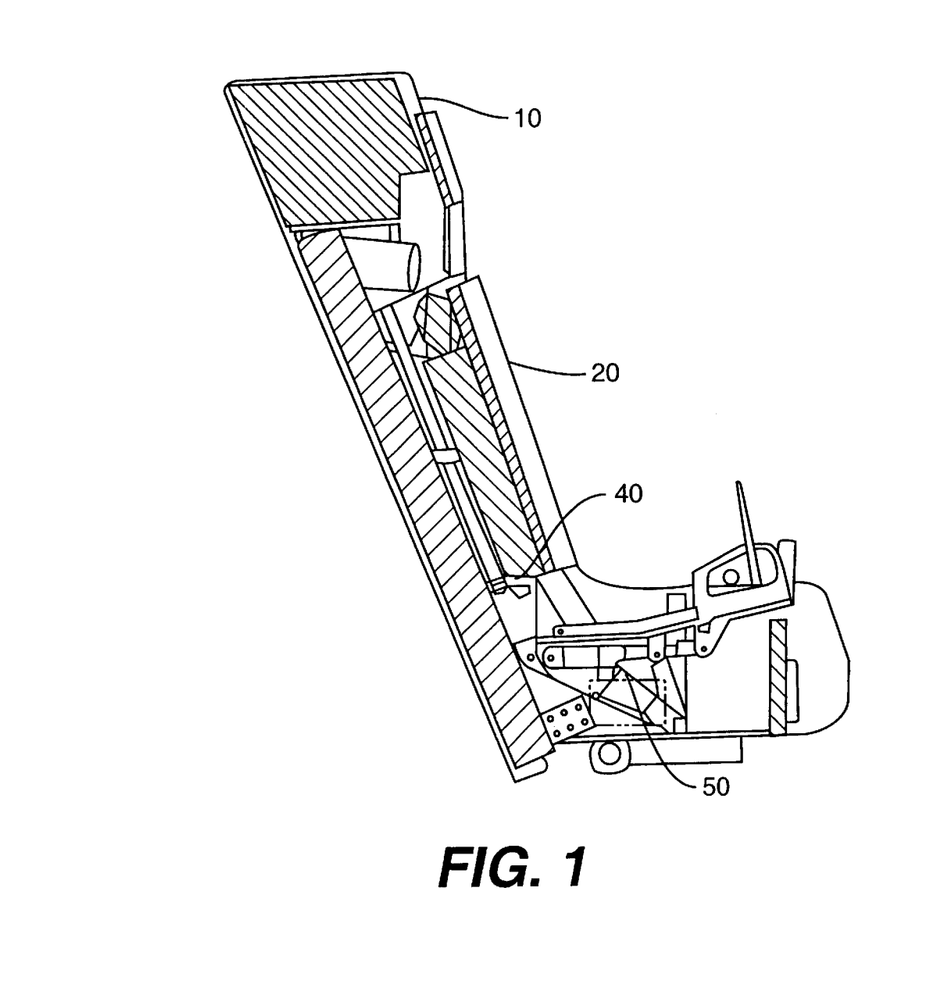
FIG. 1 is a schematic diagram of the right side of the ejection seat with the seat insert in the full down, full aft position.
Figures 3, 4:
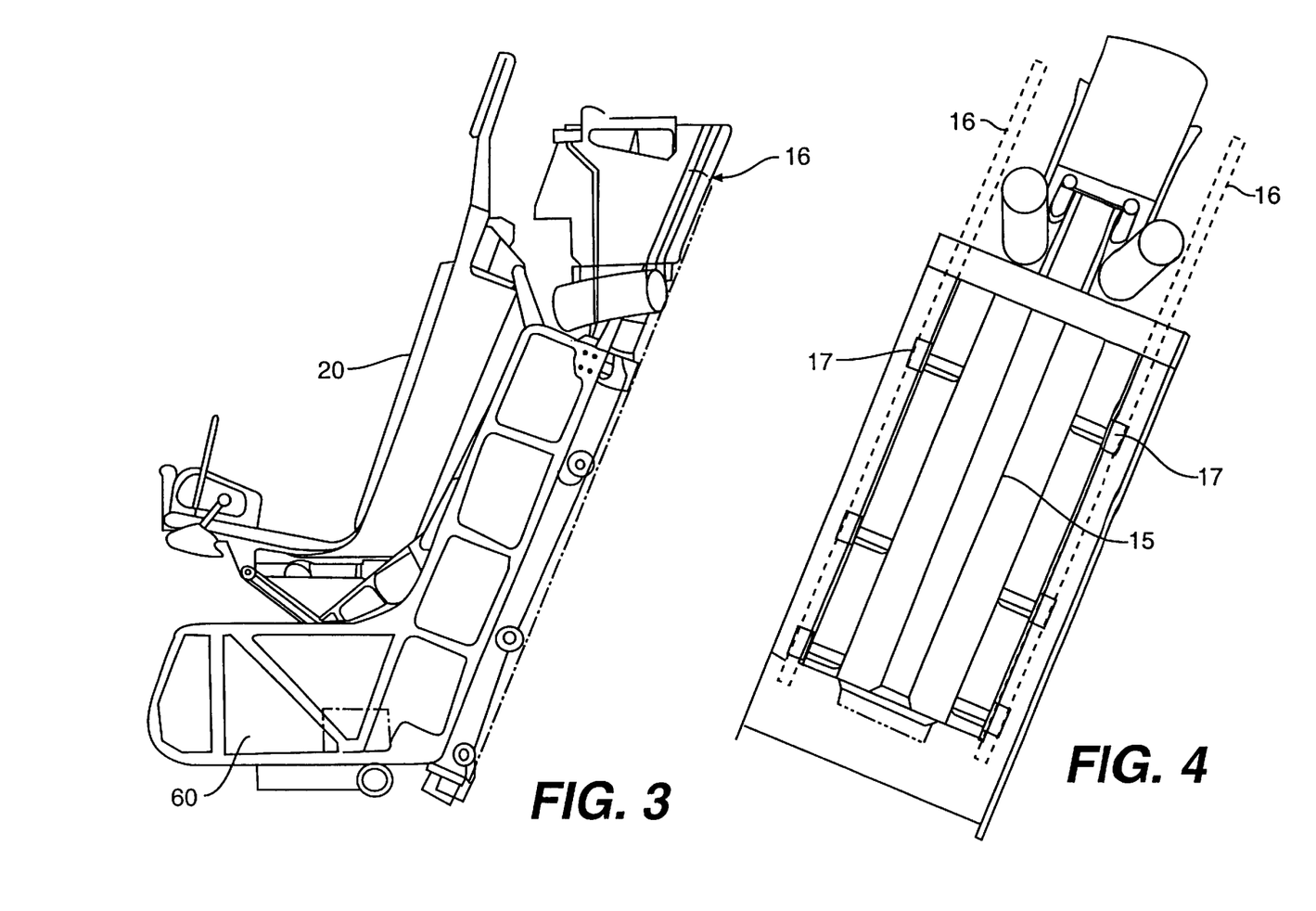
FIG. 3 is a schematic diagram of the left side of the ejection seat with the seat insert in the full up, full forward position.
FIG. 4 is a schematic diagram of the rear of the seat bucket structure.

As shown in FIGS. 1 and 3 the present invention comprises several new modularly constructed components: seat bucket structure 10, seat insert 20, adjustment linkage system 30, vertical and horizontal adjustment actuators 40 and 50 (respectively) and equipment bays 60. The seat insert fits into the seat bucket structure and moves vertically and/or horizontally relative to the bucket structure to provide the proper seat occupant position in the cockpit. This movement is accomplished by the adjustment linkage system and accompanying vertical and horizontal actuators. The seat bucket structure does not move as the seat position is adjusted. Unlike prior art ejection seats, the modular construction of the new ejection seat permits removal of the seat without requiring removal of the aircraft canopy. Each of the components of the invention are described below.

Figure 5A:
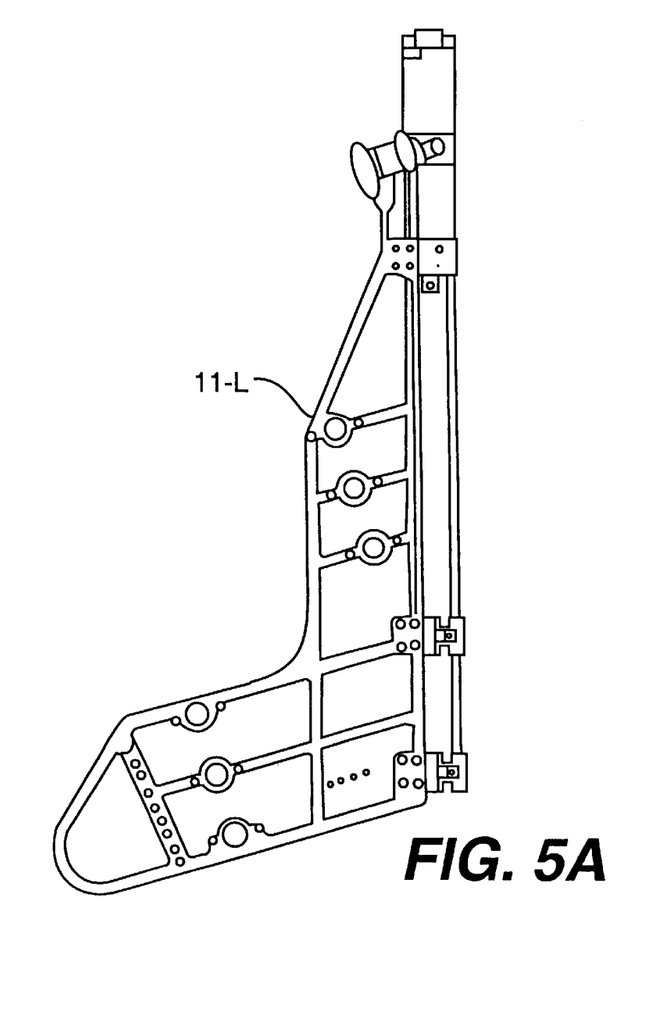
FIG. 5 is a schematic diagram of the bucket structure, showing (a) the outer face of the left side, (b) the front face of the back support (c) the top face of the bottom support and (d) the inner face of the left side showing the linkage guide tracks.
Figure 5B:
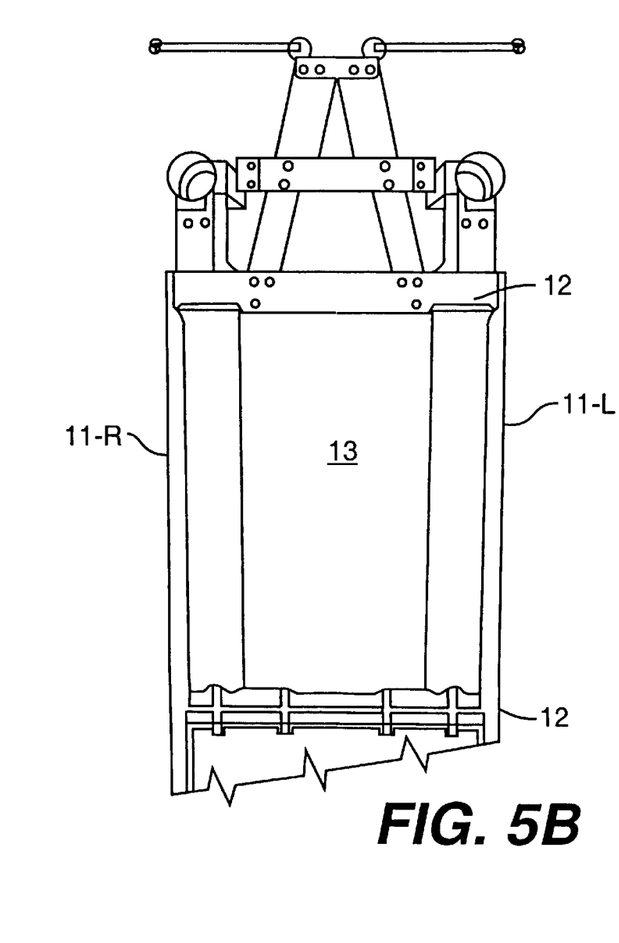
Figure 5C:
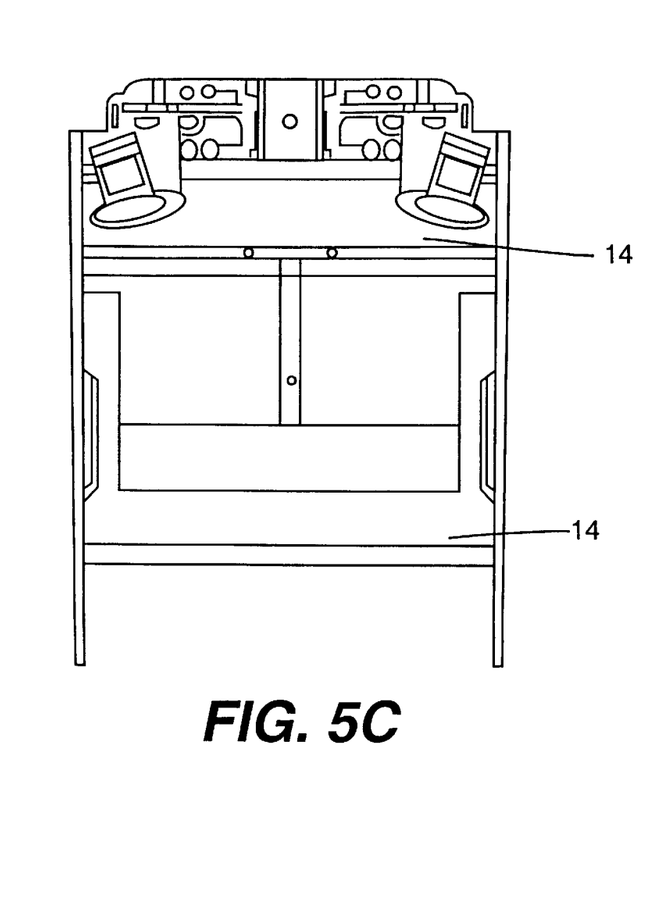
Figure 5D:
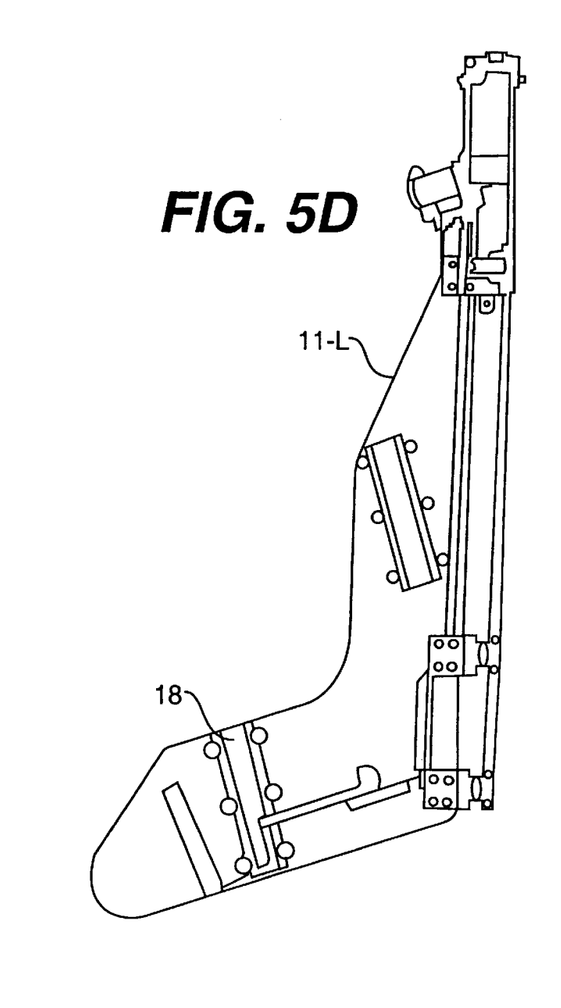

Seat Bucket Structure: Seat bucket structure 10 is a rigid three-dimensional body forming the outer frame of the ejection seat. (See FIG. 1) The remaining ejection seat components are contained within or attached to the seat bucket structure. Seat bucket structure 10 comprises two "L" shaped side walls 11, which for clarity, are herein identified as left side wall 11-L and right side wall 11-R. (See FIGS. 5a–5d) The side walls are joined by back support beams 12, which are covered with sheet metal to form the back wall 13 (See FIG. 5b). Bottom support beams 14 join the lower potion of the "L" shaped side walls to form a rectangular frame along the bottom of the seat bucket structure (See FIG. 5C). The catapult gun (not shown) and rocket motor 15 are attached to the back of the seat bucket structure (See FIG. 4). The forces generated by the gun and/or rocket motor operate directly upon the seat bucket structure. Seat bucket structure 10 slides along the outer face of back wall 13 via fixed ejection rails 16 which are attached to the aircraft (See FIG. 4). Two parallel ejection guide tracks or channels 17 on back wall 13 attach the ejection seat system to ejection rails 16 and maintain the proper alignment of the seat relative to the aircraft. During an emergency ejection sequence, the entire seat bucket structure slides up the ejection rails along ejection guide tracks 17.

Figure 6:
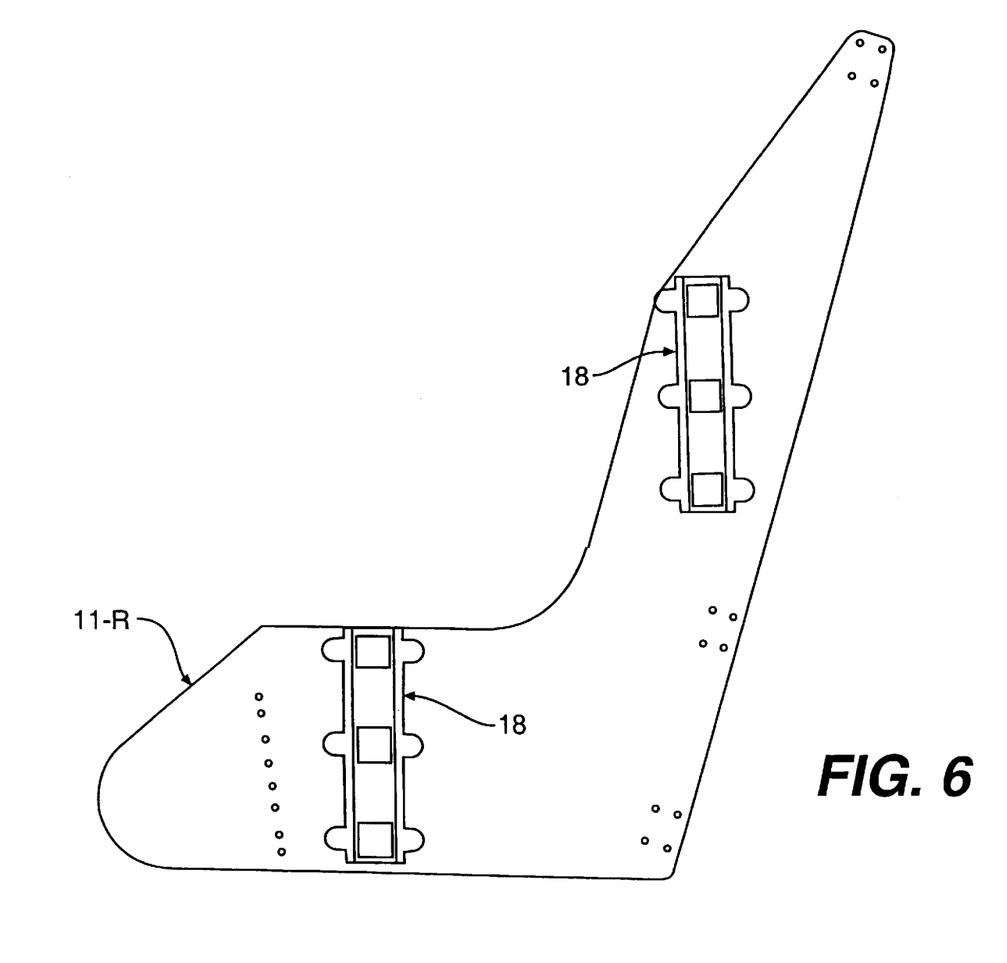
FIG. 6 is a schematic diagram of the inner face of the right side of the seat bucket structure, showing the location of the adjustment linkage guide tracks.
Figure 7:
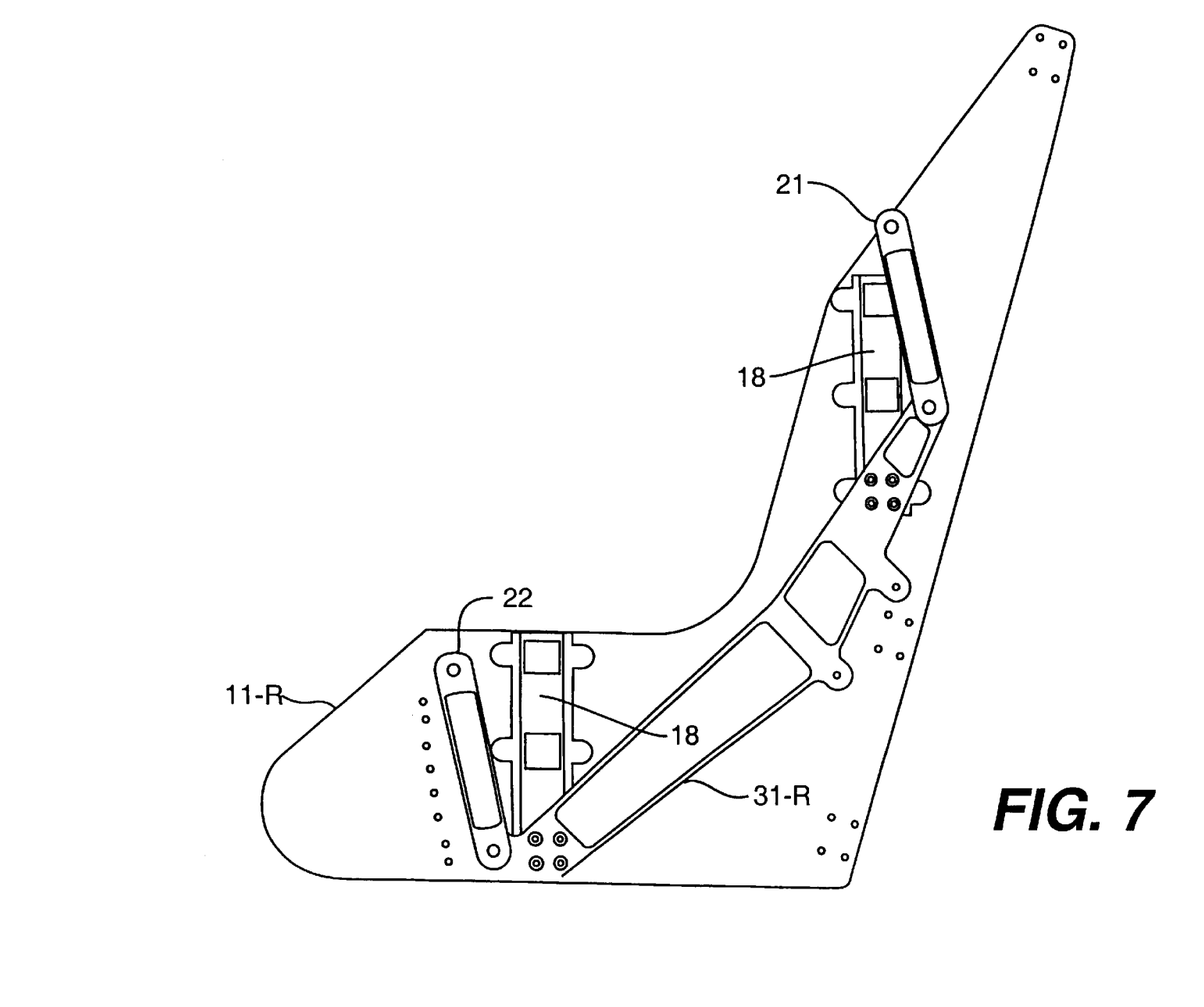
FIG. 7 is a schematic diagram of the inner face of the right side of seat bucket structure and adjustment linkage system, showing the linkage in the full down, full forward position.

Two parallel linkage guide tracks 18 are located on the inner face of each side wall 11 of seat bucket structure 10. (See FIG. 6) These linkage guide tracks are normal to bottom support beams 14 and function to guide the vertical (up/down) movement of the seat adjustment linkage system 30 relative to the seat bucket structure. As shown in FIGS. 7–10, regardless of its vertical position, linkage adjustment system 30 maintains the same alignment relative to back wall 13 and ejection rails 16 ensuring stability during ejection operations.

In one embodiment of the present invention, seat bucket structure 10 is made of bolted and riveted aluminum components and is capable of sustaining at least 32 G crash loads with the seat occupied by the heaviest occupant (approximately 250 pounds).

In another embodiment of the present invention, external slippers (six each) are mounted to back wall 13 in lieu of ejection guide tracks 17 and serve the same purpose, as described above.

Figure 8:
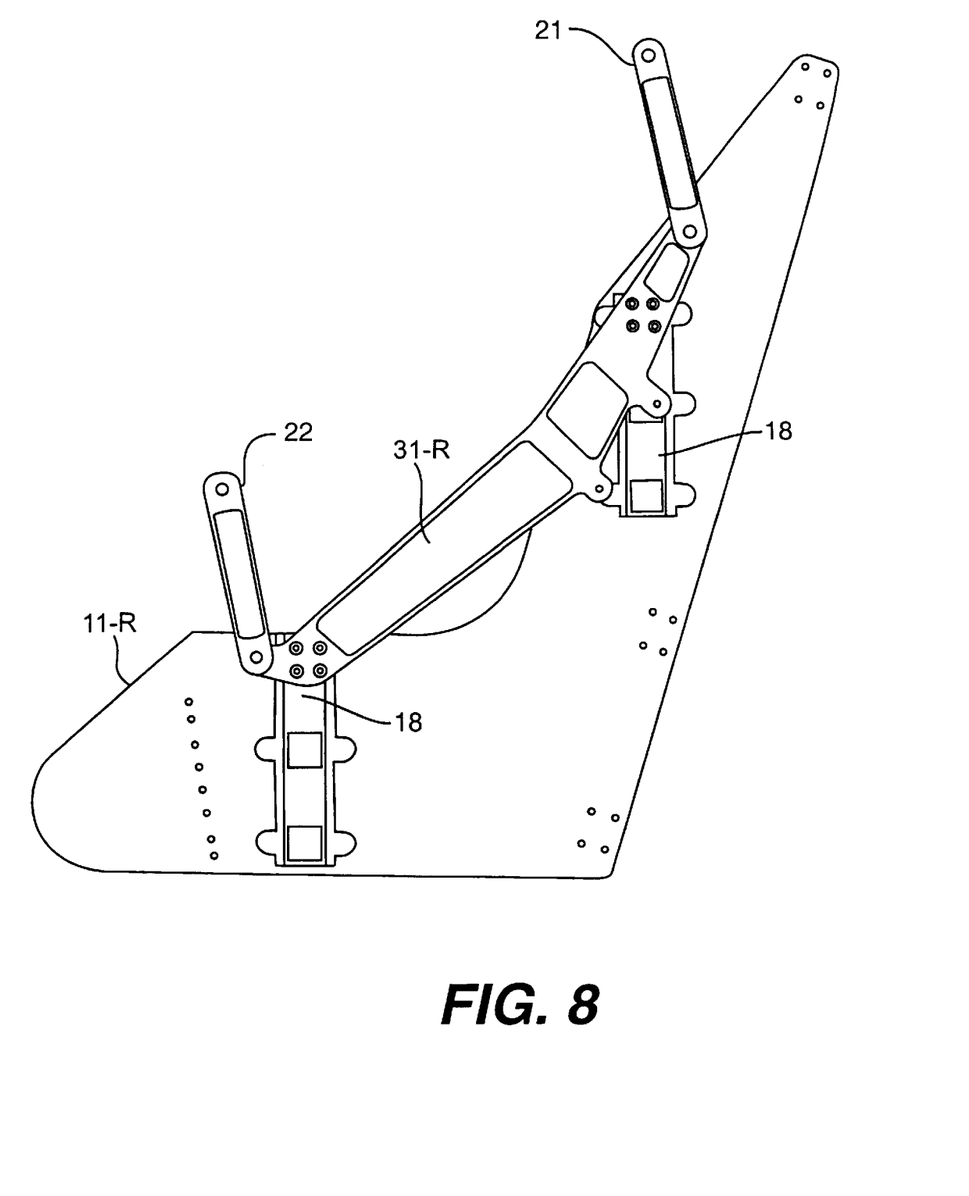
FIG. 8 is a schematic diagram of the inner face of the right side of seat bucket structure and adjustment linkage system, showing the linkage in the full up, full forward position.
Figure 9:
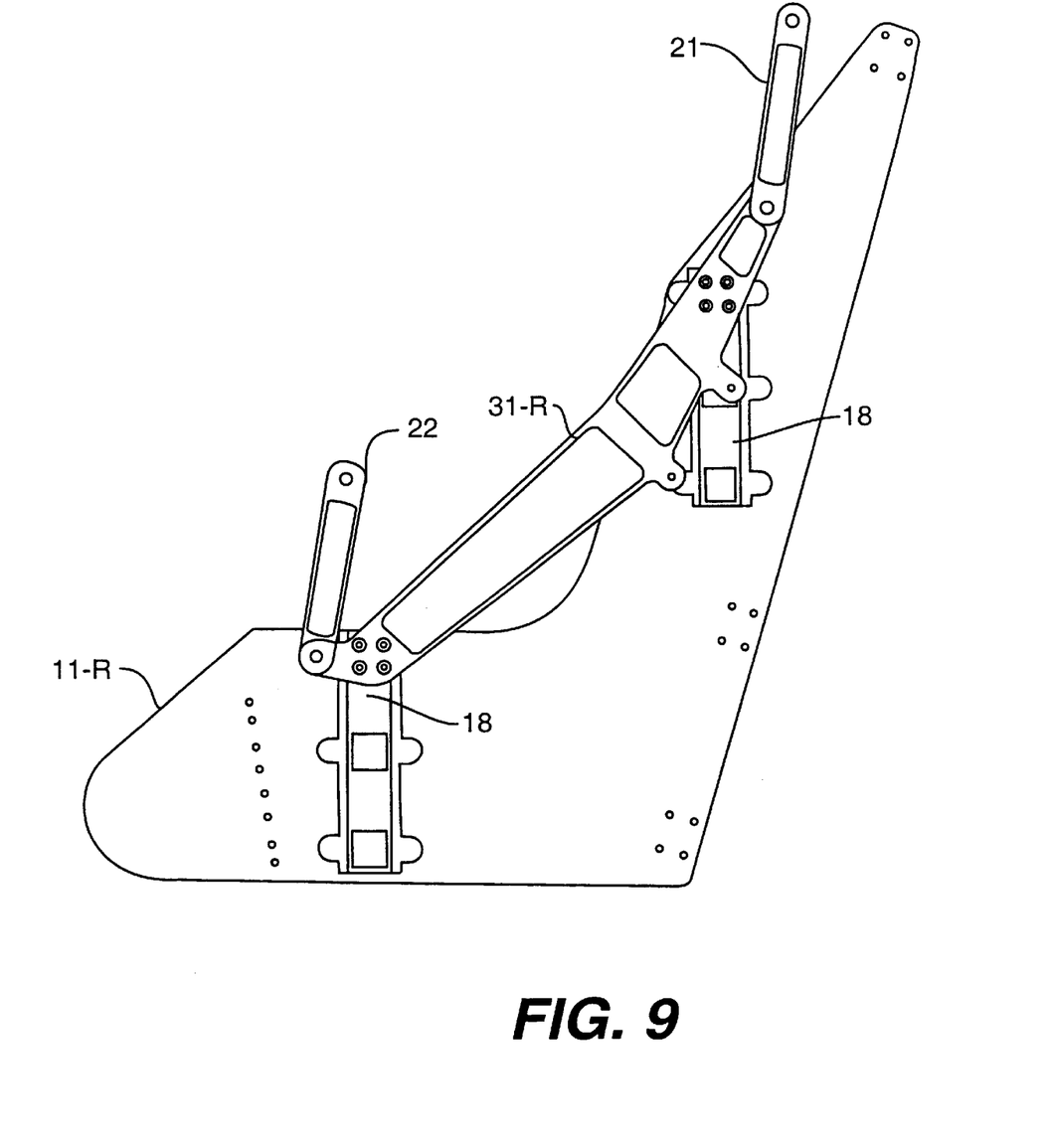
FIG. 9 is a schematic diagram of the inner face of the right side of seat bucket structure and adjustment linkage system, showing the linkage in the full up, full aft position.
Figure 10:
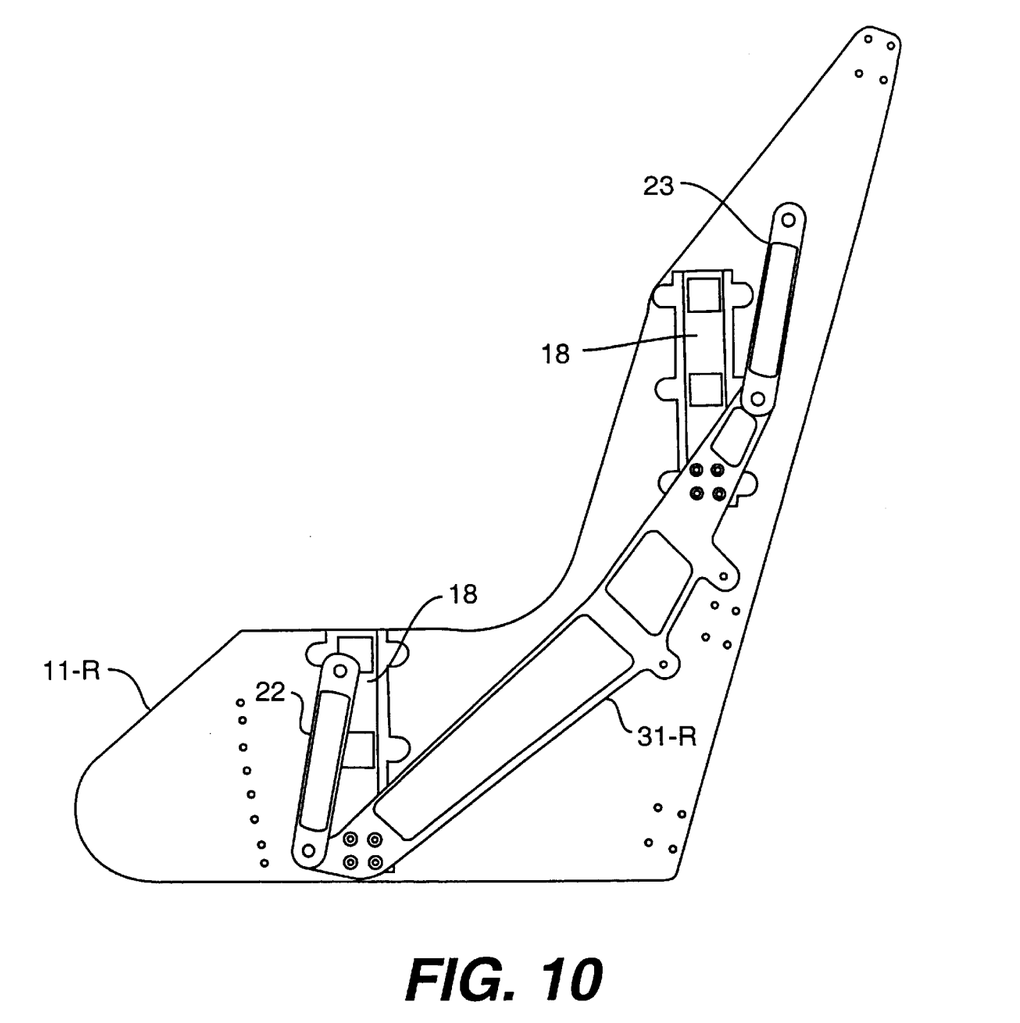
FIG. 10 is a schematic diagram of the inner face of the right side of seat bucket structure and adjustment linkage system, showing the linkage in the full down, full aft position.
Figure 11:
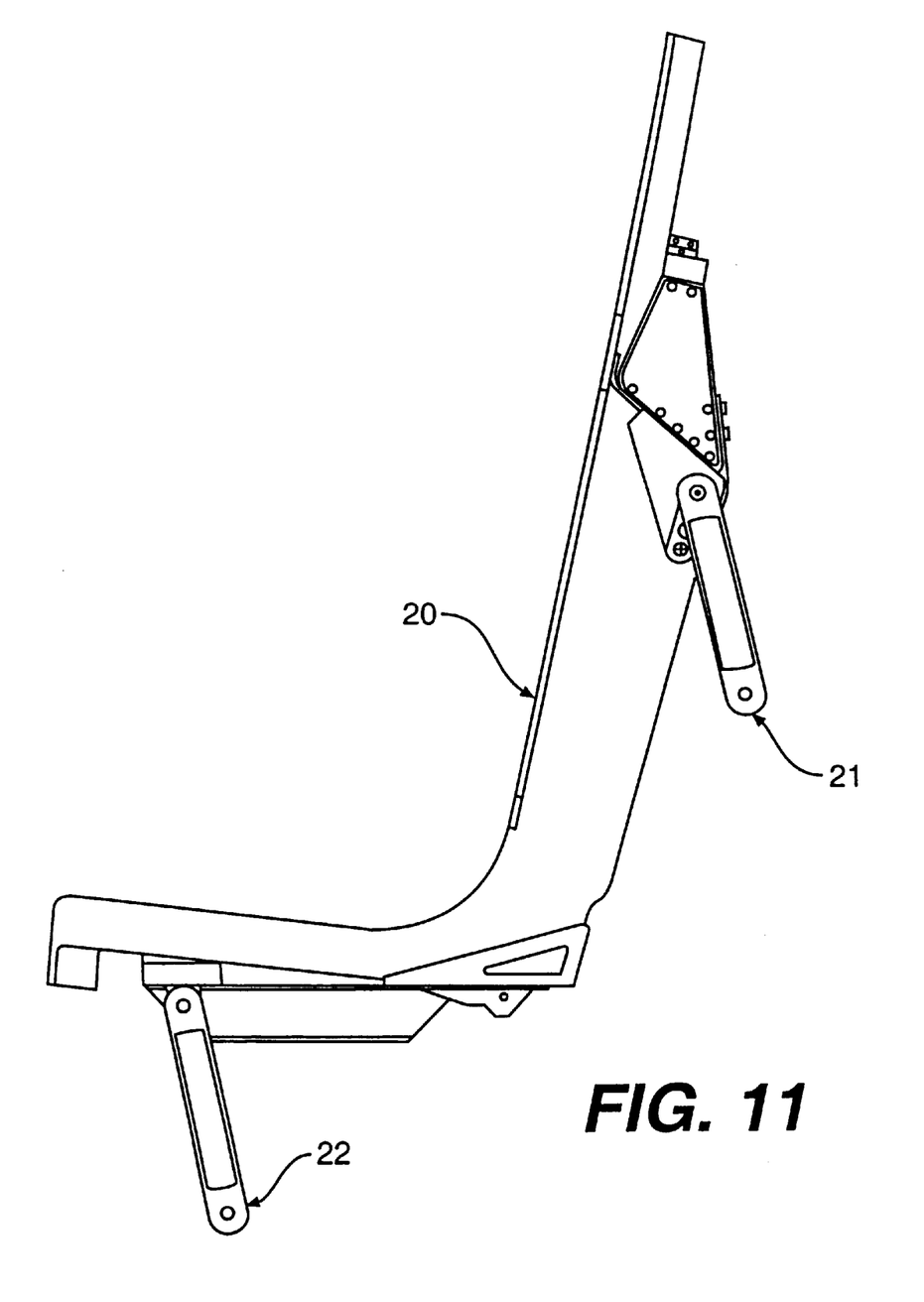
FIG. 11 is a schematic diagram of the adjustment linkage system, showing the left and right carrier beams, longitudinal beam, tension straps and horizontal actuator beam.

Seat Insert: Seat insert 20 provides the support surfaces for the seat occupant. (FIG. 11) Seat insert 20 comprises a seat and four attachment support levers. The top ends of upper support levers 21 and lower support levers 22 are attached at the upper and lower ends of the seat insert as shown in FIG. 11. Although FIG. 11 shows only one set of upper and lower support levers (the left side levers), it is to be understood that in a preferred embodiment, a set of upper and lower support levers are similarly connected on the right side of seat insert 20. The support levers are connected to adjustment linkage system 30 and are parallel with each other. The parallel support levers allow the seat insert to pivot forward and backward and up and down in response to adjustment by horizontal actuator system 50 as described below. The upper and lower support levers pivot so that the ends move in an arc as the actuator acts on the support levers. FIGS. 8 and 9 show the movement of the support levers relative to the seat bucket structure and the carrier beams as the seat is horizontally adjusted. As shown in the figures, the upper end of each support lever moves, while the bottom ends are pivot points.

Figure 2:
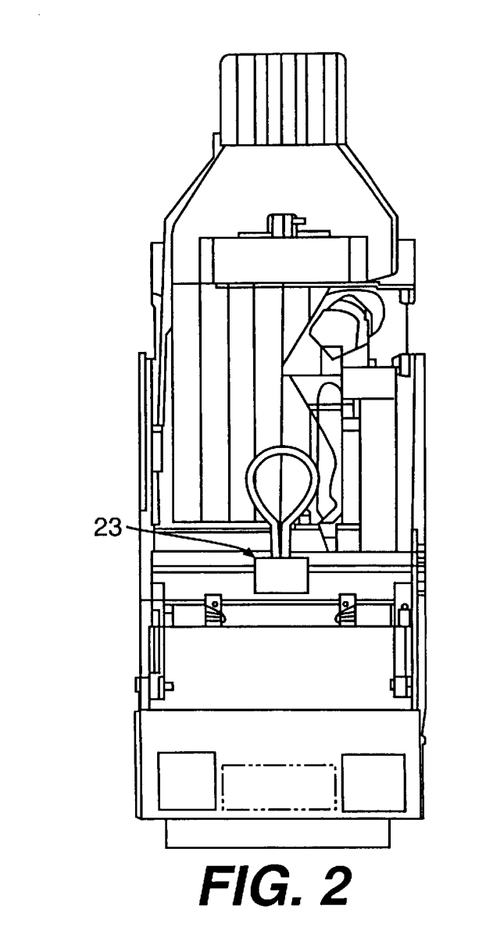
FIG. 2 is a schematic diagram of the front of the ejection seat.

In a preferred embodiment of the invention, the seat insert is an integral structure fabricated from composite materials. The seat insert also serves as the mounting platform for other components of the ejection seat such as the ejection control 23 (shown in FIG. 2), safe/arm control, inertia reel manual control, emergency release control, inertia reel, lap belts and the torso release mechanism.

Figure 12:
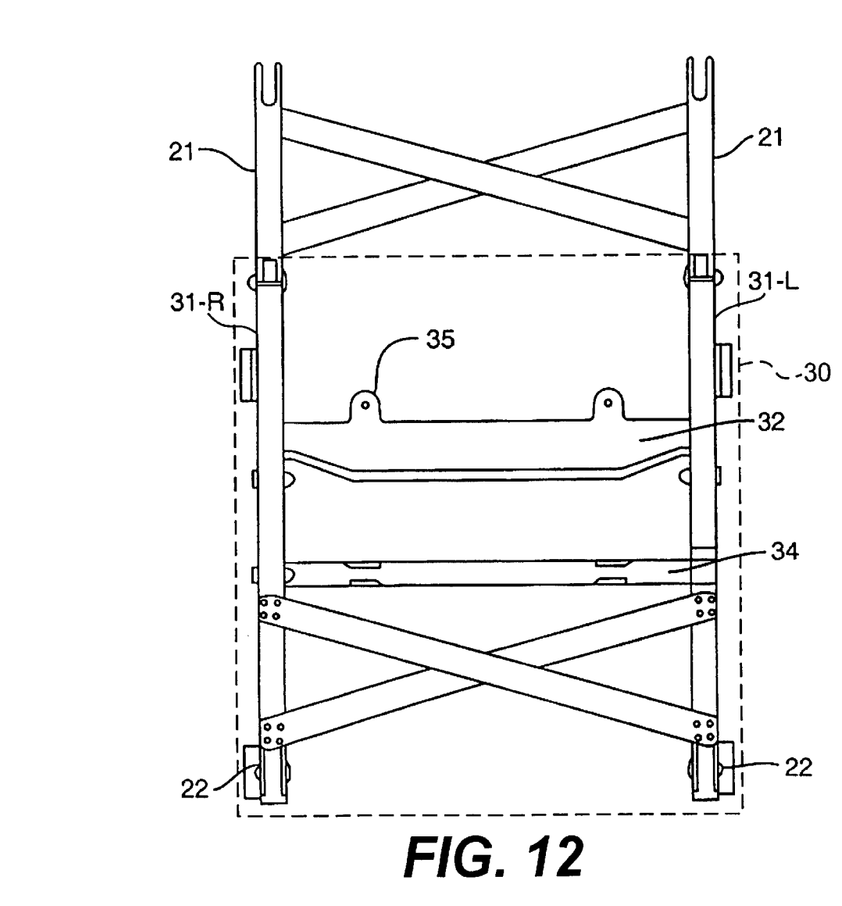
FIG. 12 is a schematic diagram of the outer face of the left carrier beam of the adjustment linkage system.

Adjustment Linkage System: Adjustment linkage system 30 interfaces between seat bucket structure 10 and seat insert 20 allowing adjustment of the seat height and horizontal position. The adjustment linkage system has at least one carrier beam which support the loads from the seat insert and seat occupant. In a preferred embodiment, adjustment linkage system 30 comprises two carrier beams 31 providing alignment and support for the seat insert. (See FIG. 12) For clarity, carrier beams 31 are herein identified as left carrier beam 31-L and right carrier beam 31-R. The carrier beams are attached to each other by longitudinal beam 32 and tension straps 33 to form a rigid structure, as shown in FIG. 12. Horizontal actuator beam 34 supports horizontal actuator 50 and provides further support between carrier beams 31.

Vertical attachment point 35 is a point on longitudinal beam 32 where one end of vertical actuator 40 is connected to linkage system 30. The other end of vertical adjustment actuator 40 is attached directly to seat bucket structure 10. In one embodiment of the present invention, the top end of vertical adjustment actuator 40 is attached to the seat bucket structure and the lower end is attached to longitudinal beam 32. In this embodiment, as the vertical actuator is extended linkage system 30 is pushed downward. When the actuator is retracted, linkage system 30 is pulled upward. In another embodiment, the bottom end of the vertical actuator is attached to the seat bucket structure and the top end is attached to the carrier beam. In this embodiment, linkage system 30 is pushed upward when the actuator is extended and pulled downward when the actuator is retracted.

Figure 13:
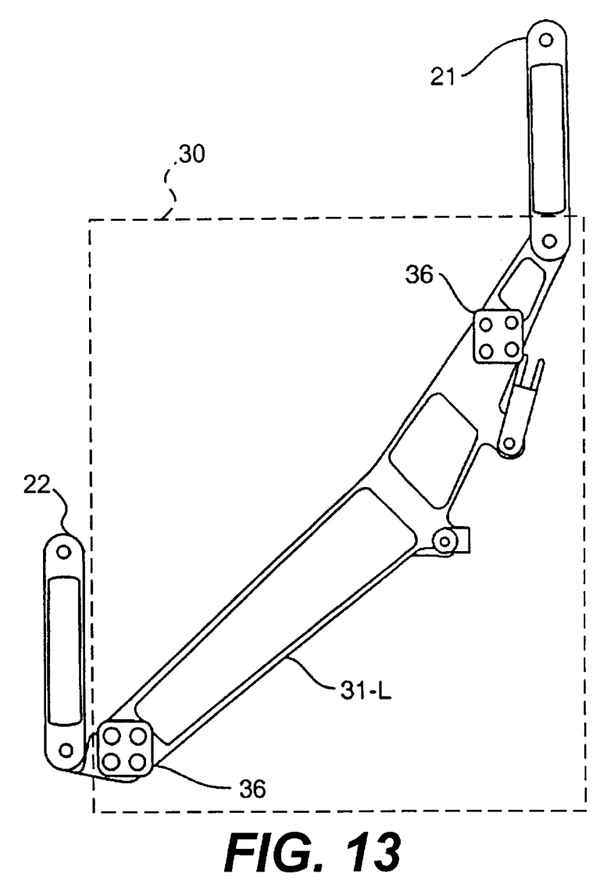
FIG. 13 is a schematic diagram of the left side of seat insert and support levers.

As shown in FIG. 13 linkage guide blocks 36 attached to the outer face of each carrier beam slide up and down in linkage guide tracks 18 on the inner face of side walls 11 of seat bucket structure 10. As seen in FIGS. 7 through 10 the angle of linkage carrier beams 31 relative to seat bucket structure 10 does not change as the vertical height is adjusted, thus the proper alignment for ejection is maintained regardless of the vertical adjustment position.

Upper support levers 21 and lower support levers 22 of seat insert 20 are attached to the upper and lower ends of each carrier beam 31 as shown in FIG. 12. As discussed above, seat insert 20 is supported by the ends of each support lever. FIG. 13 shows the outer face of left carrier beam 31-L with upper support lever 21 and lower support lever 22 attached. FIG. 13 also shows linkage guide blocks 36 on the outer face of left carrier beam 31-L. Two support levers and two guide blocks are similarly attached to right carrier beam 31-R (not shown).

Figure 14:
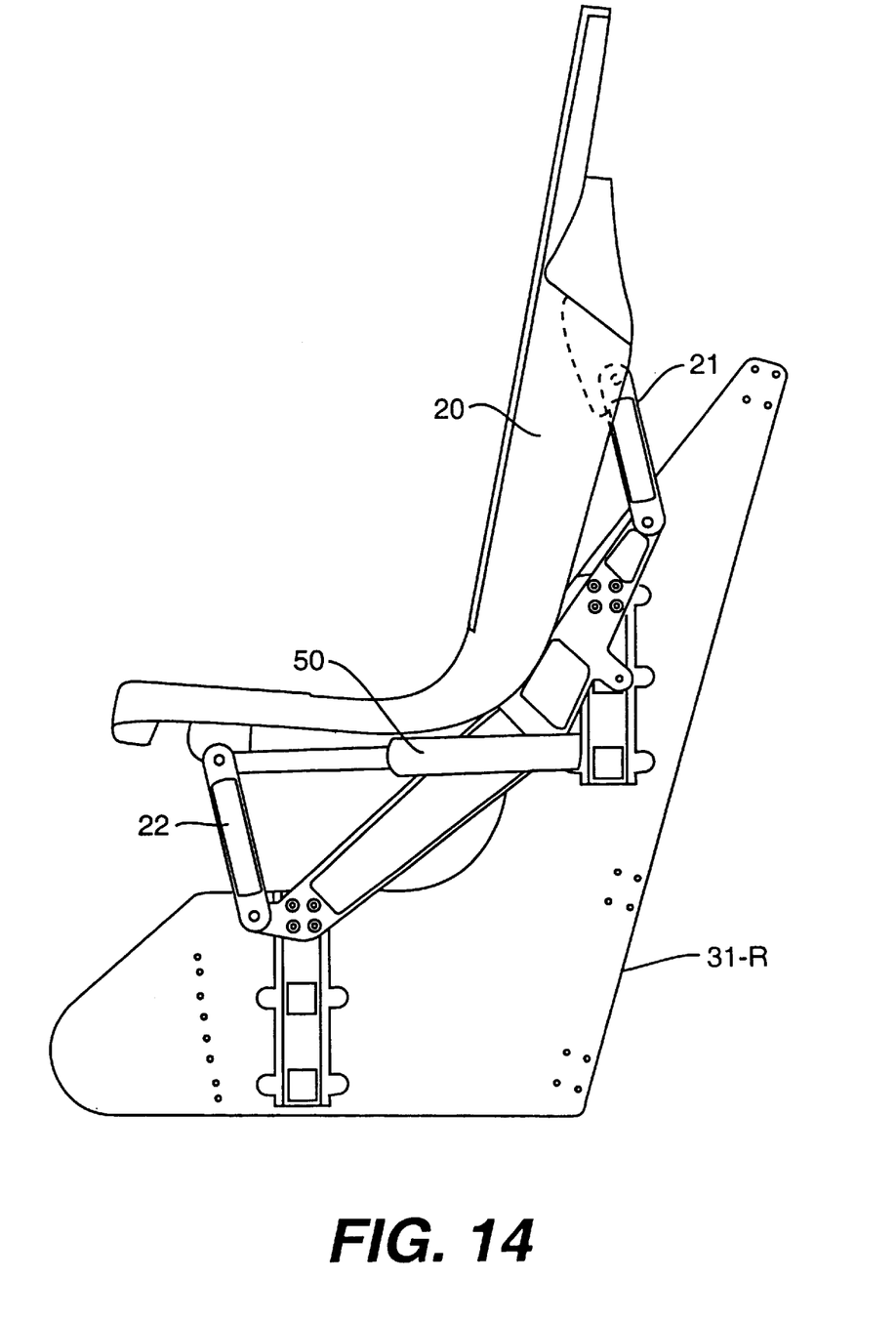
FIG. 14 is a schematic diagram of the inner face of the right side of seat bucket structure with the seat insert and adjustment linkage system in the full up, full forward position.

In a preferred embodiment, horizontal actuator 50 is attached at one end to horizontal actuator beam 34. At the other end the actuator is attached to the top ends of lower support levers 22 as shown in FIG. 14. When the horizontal actuator is extended, seat insert 10 is pushed down and forward. When the actuator is contracted, seat insert 10 is pulled up and backward. In an alternate embodiment the other end of horizontal actuator 50 is attached to the top ends of upper support levers 21. In this embodiment, when the horizontal actuator is extended, seat insert 10 is pushed up and backward. Conversely, when the actuator is contracted, seat insert 10 is pulled down and forward.

In either embodiment, adjustment by the horizontal actuator causes the seat insert to move both horizontally and vertically relative to the seat bucket structure. This combination of movement maintains the proper attitude of the seat insert relative to the seat bucket structure, which is necessary to ensure the crewmember has the proper posture for flight. The downward movement can be independently compensated for via the vertical adjustment capability described below.

Vertical Adjustment Actuator: Vertical adjustment actuator 40 provides the force needed to adjust the seat insert in the upward and downward directions. Vertical adjustment actuator 12 joins adjustment linkage system 11 to seat bucket structure 10 as described above. Vertical adjustment actuator 12 supports linkage system 30, seat insert 20 and the seat occupant. Vertical adjustment actuator 12 must have sufficient reach to provide extended vertical movement and must sustain the loads of the seat insert and its occupant.

In a preferred embodiment, the vertical actuator would provide about seven inches or more of vertical adjustment and operate on 28 Volts DC power (VDC). An actuator such as that used in SIIS ejection systems could be modified to provide the extended vertical adjustment range.

Horizontal Adjustment Actuator: In a preferred embodiment, horizontal adjustment actuator 50 attaches to horizontal actuator beam 34 at one end and the lower support levers 22 at the other, as described above. As the actuator extends or contracts, the support levers and seat insert move in an arcuate fashion relative to the adjustment linkage system as described above.

In a preferred embodiment, a gas-operated piston cylinder device rapidly repositions the seat insert/occupant to the full aft position upon initiation of the emergency ejection sequence. This is desirable to ensure the best load balancing of the seat and occupant. The preferred embodiment further comprises a horizontal actuator operating on 28 Volts DC power and providing at least about 3 inches of horizontal adjustment. An actuator such as that used in the SIIS ejection system may be modified to meet these requirements. This subsystem accommodates the full range of current and planned male and female crew anthropometry.

Equipment Bays: Seat structure 10 has open compartment areas, or equipment bays 60, available for crew equipment, avionics or other cockpit systems. The free space is created by vacuum packing and environmentally sealing the survival kit. In this manner, a volume of 950 cubic inches of life raft and survival gear can be stowed in the back support section of the seat insert leaving the area under the seat free for other uses. The kit also provides the occupant with back cushioning and lumbar support. This allows more efficient escape and evasion mobility upon parachute landing in hostile situations. An automatic survival kit deployment and automatic emergency beacon switches are provided for crew in-flight selection.

In the preferred embodiment, the available compartments are 28×3×2.5, 20×3×2.5 and 16×7×5.5 inches (210, 150 and 615 cubic inches, respectively). The equipment bays provide volume for current or planned installation of non-ejection, mission-oriented avionics or life support equipment for additional ballast during ejection. This additional non-ejection seat equipment weight is not assessed as seat system weight but rather as part of the cockpit system providing greater flexibility for future system requirements.

Other Components of the Preferred Embodiment: The preferred embodiment of this invention provides independent horizontal and vertical adjustment, modular construction, extra equipment bays in addition to those features typically used in emergency ejection seats. Such additional features include main recovery parachute container, parachute mortar, deployable pitot tubes and yaw stabilization systems. In this embodiment, the main parachute recovery parachute is sealed in a composite, two piece container which is mounted to its mortar which in turn is mounted to the top of the seat structure. The parachute and its container can be removed from the seat for maintenance without removing the seat from the cockpit. The size and shape of the container permits a greater aft field of view than the old seat.

The parachute mortar in the preferred embodiment is a dual two-tube unit powered by the existing seat ballistic initiator. When operated, it provides sufficient energy to propel the parachute aftward to full line stretch. The pitot tubes are mounted to swivel units at the top of the seat structure. Upon ejection the pitot tubes are deployed from their stowed position to a location in the free airstream where they can actually experience total dynamic pressure. Their geometry allows for accurate readings even when misaligned with the free-stream by as much as 45 degrees. The stowed position permits the crew a wider aft field of view. Finally, the telescoping stabilizer surfaces with decelerator drogue parachutes are mounted on each side of the seat structure. These units are activated during catapult stroke via the recovery sequencer and become effective almost immediately at or near rail separation. Their effective moment arm in the Y-axis prevents the seat/occupant from yawing beyond physiological limits in high-speed ejections. The yaw stability surfaces with the decelerators also act to stabilize the seat/occupant during high altitude descent until recovery parachute activation via the sequencer.

The preferred embodiment of the invention has passive arm restraints incorporated into the seat insert. Upon ejection signal to the inertia real haul-back gas generator these restraints will deploy and inflate to restrict upper arm outboard excursions during windblast loading. Upon seat/occupant separation the crew separates from the arm restraint without entanglement hazard. A thigh lifter also inflates upon signal to the inertia reel gas generator and raises the thighs to bring the occupant into a pre-eject position and to reduce the exposed area of the legs to windblast. Leg restraint straps, which are individually donned or integrated into the anti-gravity suit by the seat occupant upon harness hook-up, are attached by ratchets on the seat bucket front panel. These ratchets lock the leg restraint straps in the retracted position upon catapult stroke and release at seat/occupant separation.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. An adjustable emergency ejection seat comprising:
   (a) a seat insert for supporting an occupant;
   (b) an adjustment linkage system comprising at least one carrier beam for supporting the seat insert;
   (c) a plurality of parallel support levers, each support lever pivotally connected at a first end to the seat insert and at a second end to the adjustment linkage system to support the seat insert for arcuate movement with respect to the adjustment linkage system;
   (d) a seat bucket structure supporting the adjustment linkage system; and
   (e) a horizontal adjustment actuator pivotally connected at a first end to the adjustment linkage system and at a second end to the first end of at least one of the plurality of parallel support levers.

2. The adjustable emergency ejection seat of claim 1, wherein the plurality of parallel support levers comprises two upper support levers and two lower support levers.

3. The adjustable emergency ejection seat of claim 2, wherein the second end of the horizontal adjustment actuator is pivotally connected to the first end of at least one of the lower support levers.

4. An adjustable emergency ejection seat comprising:
   (a) a seat bucket structure;
   (b) an adjustment linkage system slidably connected to the seat bucket structure for vertical movement with respect to the seat bucket structure, said adjustment linkage system comprising a first support lever pivotally connected to a first end of the adjustment linkage system and a second support lever pivotally connected to a second end of the adjustment linkage system;
   (c) a seat insert pivotally connected at a first end to the first support lever and pivotally connected at a second end to the second support lever;
   (d) a vertical adjustment actuator connected at a first end to the seat bucket structure and at a second end to the adjustment linkage system; and
   (e) a horizontal adjustment actuator pivotally connected at a first end to the adjustment linkage system and pivotally connected at a second end to one of said first or second support levers.

5. The adjustable emergency ejection seat of claim 4, wherein the seat bucket structure comprises two side walls connected by a plurality of back support beams and a plurality of bottom support beams, wherein an inner face of each side wall comprises a plurality of linkage guide tracks for slidably connecting the seat bucket structure to the adjustment linkage system.

6. The adjustable emergency ejection seat of claim 5, further comprising a plurality of guide blocks attached to the adjustment linkage system for slidably connecting the adjustment linkage system to the linkage guide tracks.

7. An adjustable emergency ejection seat comprising:
   (a) a seat bucket structure;
   (b) an adjustment linkage system slidably connected to the seat bucket structure for vertical movement with respect to the seat bucket structure;
   (c) a seat insert;
   (d) a plurality of parallel support levers, each support lever pivotally connected at a first end to the seat insert and at a second end to the adjustment linkage system to support the seat insert for arcuate movement with respect to the adjustment linkage system;
   (e) a vertical adjustment actuator connected at a first end to the seat bucket structure and at a second end to the adjustment linkage system; and
   (f) a horizontal adjustment actuator pivotally connected at a first end to the adjustment linkage system and at a second end to the first end of at least one of the plurality of parallel support levers.

8. The adjustable emergency ejection seat of claim 7, wherein the plurality of parallel support levers comprises two upper support levers and two lower support levers.

9. The adjustable emergency ejection seat of claim 8, wherein the second end of the horizontal adjustment actuator is pivotally connected to the first end of at least one of the lower support levers.

10. The adjustable emergency ejection seat of claim 7, wherein the seat bucket structure comprises two side walls connected by a plurality of back support beams and a plurality of bottom support beams, wherein an inner face of each side wall comprises a plurality of linkage guide tracks for slidably connecting the seat bucket structure to the adjustment linkage system.

11. The adjustable emergency ejection seat of claim 10, further comprising a plurality of guide blocks attached to the adjustment linkage system for slidably connecting the adjustment linkage system to the linkage guide tracks.

12. An adjustable modular emergency ejection seat comprising:
   (a) a seat bucket structure;
   (b) an adjustment linkage system slidably connected to the seat bucket structure for vertical movement with respect to the seat bucket structure;
   (c) a seat insert;
   (d) a plurality of parallel support levers, each support lever pivotally connected at a first end to the seat insert and at a second end to the adjustment linkage system to support the seat insert for arcuate movement with respect to the adjustment linkage system;
   (e) a vertical adjustment actuator connected at a first end to the seat bucket structure and at a second end to the adjustment linkage system; and
   (f) a horizontal adjustment actuator pivotally connected at a first end to the adjustment linkage system and at a second end to the first end of at least one of the plurality of parallel support levers, wherein at least one of the seat insert or the adjustment linkage system or the vertical adjustment actuator or the horizontal adjustment actuator are removable.

13. The adjustable modular emergency ejection seat of claim 12, wherein the plurality of parallel support levers comprises two upper support levers and two lower support levers.

14. The adjustable modular emergency ejection seat of claim 13, wherein the second end of the horizontal adjustment actuator is pivotally connected to the first end of at least one of the lower support levers.

15. The adjustable modular emergency ejection seat of claim 12, wherein the seat bucket structure comprises two side walls connected by a plurality of back support beams and a plurality of bottom support beams, wherein an inner face of each two side wall comprises a plurality of linkage guide tracks for slidably connecting the seat bucket structure to the adjustment linkage system.

16. The adjustable modular emergency ejection seat of claim 15, further comprising a plurality of guide blocks attached to the adjustment linkage system for slidably connecting the adjustment linkage system to the linkage guide tracks.

17. The adjustable modular emergency ejection seat of claim 12, further comprising a plurality of equipment bays.

18. The adjustable emergency ejection seat of claim 17, further comprising a plurality of non-ejection seat equipment stored inside the plurality of equipment bays, wherein said plurality of non-ejection seat equipment provides additional ballast to the adjustable emergency ejection seat.

19. An adjustable emergency ejection seat comprising:
   (a) a seat bucket structure;
   (b) an adjustment linkage system slidably connected to the seat bucket structure for vertical movement with respect to the seat bucket structure;
   (c) a seat insert connected to the adjustment linkage system; and
   (d) a vertical adjustment actuator connected at a first end to the seat bucket structure and at a second end to the adjustment linkage system, wherein the seat bucket structure comprises two side walls connected by a plurality of back support beams and a plurality of bottom support beams, wherein an inner face of each side wall comprises a plurality of linkage guide tracks for slidably connecting the seat bucket structure to the adjustment linkage system.

20. The adjustable emergency ejection seat of claim 19, further comprising a plurality of guide blocks attached to the adjustment linkage system for slidably connecting the adjustment linkage system to the linkage guide tracks.

* * * * *